Sept. 23, 1952        J. L. PETERSON        2,611,794
TERMINAL ASSEMBLY FOR ELECTRIC-CELL BATTERIES
Filed June 26, 1950
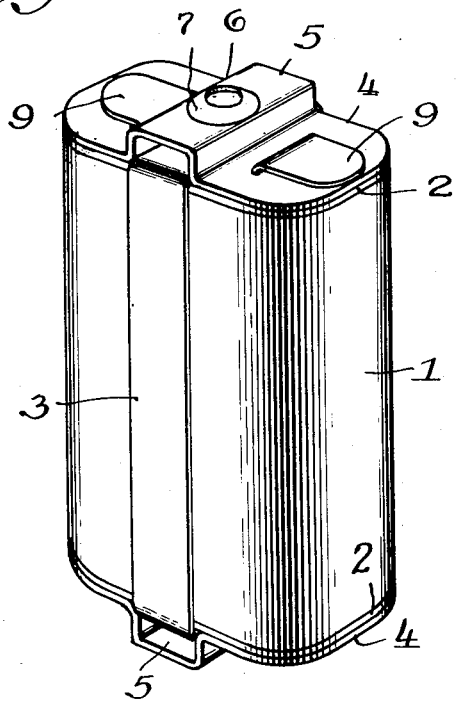
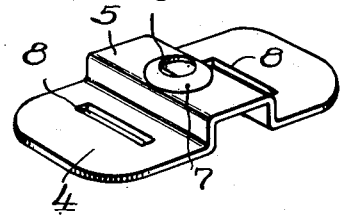
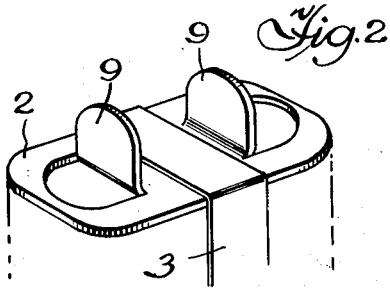
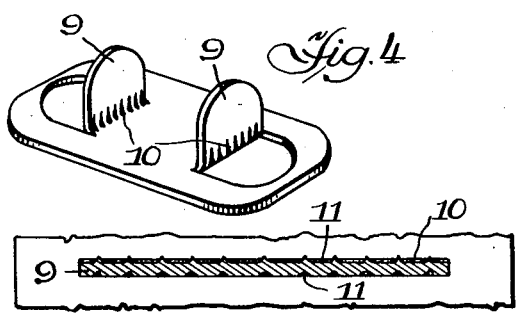
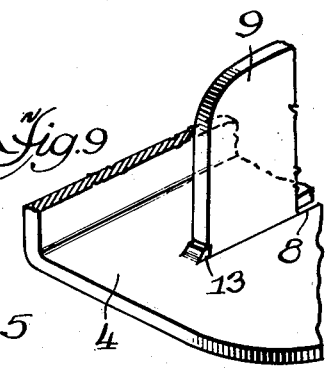
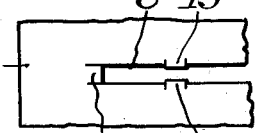
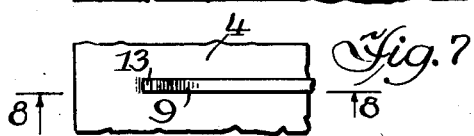
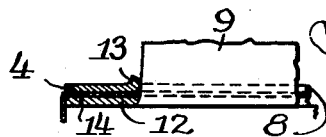
Inventor,
Jack L. Peterson,
By: Jones, Tesch & Barber Attys.

Patented Sept. 23, 1952

2,611,794

UNITED STATES PATENT OFFICE 2,611,794

TERMINAL ASSEMBLY FOR ELECTRIC-CELL BATTERIES

Jack L. Peterson, Freeport, Ill., assignor to Burgess Battery Company, Freeport, Ill., a corporation of Delaware Application June 26, 1950, Serial No. 170,359

8 Claims. (Cl. 136—135)

This invention relates to electric-cell batteries, and particularly to improved terminal assemblies therefor.

Dry batteries consist of a plurality of individual cells assembled in a suitable compact order and electrically connected to furnish the desired electrical characteristics at the battery terminal. It is general practice to dip or otherwise coat the cell assembly with a layer of inert moisture-impervious material, such as microcrystalline wax, to prevent drying of the contents of the cells and assist in preventing leakage of the cell fluids. The coating is most conveniently applied as an overall envelope so that special procedures must be employed so that uncoated terminals are available for the electrical connection of the battery with an external circuit. While this may be done by removing the coating from terminals assembled with the cells before application of the coating, it is generally more convenient and less expensive to apply the protective coating to a sub-assembly lacking the final terminals and applying the uncoated terminals as a further step in the manufacturing process.

It is an object of the present invention to provide a novel battery terminal construction which combines simplicity and minimum assembly labor cost with certainty of electrical contact. A further object is to provide a novel assembly and manufacturing method whereby the coating is removed from the battery sub-assembly terminals, electrical contact between these terminals and the battery terminal is positively established and the battery terminals are affixed to the battery assembly, all in a single operation. Other features and advantages of the invention will become apparent as the description proceeds.

In the accompanying drawing,

Fig. 1 is a perspective view of a dry battery equipped with the terminal assembly of the invention;

Fig. 2 is a perspective detail view showing the inner clip of the terminal assembly;

Fig. 3 is a perspective view of the battery terminal plate;

Fig. 4 is a perspective view of an alternative form of inner clip;

Fig. 5 is a partial sectional view of a terminal assembly taken at the top surface of the battery terminal plate and employing the clip of Fig. 4;

Fig. 6 is a partial sectional view similar to that of Fig. 5 and illustrating a further modified form of clip structure;

Fig. 7 is a top detail view of the terminal assembly showing a further modification;

Fig. 8 is a detailed sectional view taken at the line 8—8 of Fig. 7;

Fig. 9 is a perspective detail view of the assembly of Figs. 7 and 8, and

Fig. 10 is a partial plan view of a further modified form of terminal plate.

The battery illustrated in Fig. 1 is the finished article to which an outer carton may be applied, if desired. This battery may consist, for example, of a stack of individual flat cells forming the body or cell block 1 of the product. A sheet metal clip 2 is placed at each end of the cell block 1, being electrically connected by any suitable means, not shown, to the terminal of the adjacent end cell and held in position by a tape 3 which also serves to hold the cell block together. This sub-assembly may then have its sides covered by a wrapping of an inert film material and, whether or not such a wrapping is employed, this entire sub-assembly, including terminal clips 2 is coated with a thin layer of microcrystalline wax or other suitable moisture-impervious coating material. This sealing coat may be applied by dipping the sub-assembly in a bath of melted wax or by spraying or painting the sub-assembly with the coating material. The dipping process is generally preferred for this purpose because of the greater assurance of complete coverage which is essential.

Battery terminal plates 4 are provided with a raised central portion 5 having a hole 6 and boss 7 at a central location thereon for good contact with the terminals of an external circuit. As shown more clearly in Fig. 3, terminal plate 4 is provided with two parallel slots 8, one on either side of the raised portion 5 of the terminal plate. The plate may be formed from sheet copper, brass, or other suitable metal, and is not wax coated.

A pair of tabs 9 (Fig. 2) are punched and formed in clip 2, these tabs being parallel and spaced apart the same distance as slots 8 of terminal plate 4. Prior to the application of the final terminal plates, tabs 9 project outwardly from clip 2, being substantially perpendicular thereto, and are coated with the material used to seal-coat cell block 1 as a result of the dipping or other coating operation of the sub-assembly including the clips. Clips 2 may be fabricated from copper, brass, or other suitable sheet stock.

Electrical contact between clips 2 and terminal plate 4 is established by engagement of tabs 9 with the terminal plate structure, particularly the edges of slots 8. Before the terminal plate is placed in position upon clip 2 with tabs 9 projecting through the slots, the wax coating upon tabs 9 is removed by scraping or wire brushing or by means of a suitable solvent. The steps of wax removal and application of the terminal plate, in accordance with the present invention, may be combined by closely dimensioning slots 8 so that as the plate is forced upon tabs 9, the wax coatings are removed by the scraping action of the edges of slots 8. When plates 4 are seated upon clips 2, tabs 9 are bent over upon the outer surface of the terminal plates to lock the latter firmly in position upon the sub-assembly.

In order to insure positive and permanent electrical contact between terminal plates 4 and clips 2, tabs 9, or at least the base portions thereof, may be knurled as shown at 10 in Fig. 4. This expedient permits greater tolerances in the dimensions of slots 8 for the reason that the knurling increases the overall thickness of the tabs at the spaced peaks, as shown more clearly in the sectional view of Fig. 5, and the terminal plate may be pressed into position with the several peaks actually cutting into the edges of slots 8. Preferably, the width of slots 8 is slightly greater than the thickness of the upper portions of tabs 9 and the tabs are rounded as shown so that they may readily be guided into the slots in the assembly operation and pressure is necessary only when the knurled lower portions of the tabs are reached by the plate. The knurling pattern employed may have any characteristics so long as at least one peak or protuberance is provided which will make clean and positive metal-to-metal contact for electrical connection purposes. Wax or other coating material upon tabs 9 is scraped off by the edges of slots 8 as terminal plate 4 is pressed upon the inner terminal clip 2. Thin films of wax 11 may remain between slot edges and portions of the surfaces of tabs 9, but these areas are not relied upon for electrical contact and the insulating wax in such locations does no harm.

It will be appreciated that means other than knurling may be employed with similar results. Any distortion of the metal at the base portion of tabs 9 which elevates some areas above the plane of the normal surfaces of the tabs will accomplish the desired result. For example, the base portions of the tabs may be corrugated, as shown in Fig. 6, the peaks of the corrugations on both sides of the tabs firmly engaging the edge surfaces of slots 8 of the terminal plates to provide the necessary electrical contact. Here again, small areas 11 of wax coating may remain in the valleys of the corrugation 12, but the peaks are scraped clean.

A further expedient for assuring positive electrical contact is illustrated in Figs. 7, 8, and 9. In this form of the invention, the side edges of tabs 9 are tapered to converge from the base towards the free extremities of the tabs and the length of slots 8 is somewhat less than the width of the tabs at their bases with the result that as the terminal plates are forced upon the tabs, the end edges of slots 8 first scrape the side edges of the tabs clean of coating wax and are then torn or forced upwardly out of the plane of the clip as shown at 13. This results in pressure contact between the end edges of slots 8 and the edges of tabs 9 so that while wax layer 14 (Fig. 8) insulates clips 2 from plates 4, positive and permanent electrical contact is made at 13.

If still further assurance of unfailing electrical connection is desired, the sides of slots 8 as well as the ends may be provided with small cantilever leaf spring dogs 15 projecting out into the slot area as shown in Fig. 10. These spring dogs are formed as an integral part of plate 4. With tabs having base potion thicknesses greater than the distance between the free ends of spring dogs 15 but less than the width of slot 8, and having base portion widths greater than the lengths of slots 8 between the ends of the spring dogs provided at the end of the slots, the ends of the leaf spring dogs will scrape the tab surfaces clean and grip them securely when the terminal plates are forced upon the tabs. If desired, shorter tabs may be employed where the spring elements are used for mechanical and electrical contact since the springs themselves serve as dogs to prevent outward movement of the terminal plates and it is not necessary to bend the tabs over to hold the plates in position.

The terminal assemblies herein described are examples of particular forms of the invention which will readily suggest other equivalent forms. They may be employed on either or both ends of batteries and may be used whether or not the moisture-impervious coating is used to seal the cell sub-assembly. Although particularly described in connection with dry batteries, the terminal assembly of the invention may be used with any kind of electric battery.

Invention is claimed as follows:

1. In a method for making a battery comprising one or more electric cells, the combination of steps consisting of electrically attaching to said cells a metal terminal clip having a tab projecting outwardly therefrom to form a sub-assembly, dipping said sub-assembly in a bath of liquid-impervious electrically non-conductive material to form an overall coating thereon including said tab, and thereafter forcing a metal terminal plate with a registering opening upon said tab, said tab and opening being of such fit that at least a portion of said coating will be scraped from said tab to provide positive electrical contact with said plate.

2. In an electric cell battery, a terminal assembly including a clip of sheet metal attached to and electrically connected with the cells of said battery, said clip having a tab projecting outwardly therefrom, that improvement therein comprising a moisture impervious electrically non-conductive continuous coating covering said cells and extending over said clip including said tab, and a metallic terminal plate overlying said clip and coating, said plate having a narrow slot therein snugly passing the tab therethrough in frictional engagement with an edge thereof, whereby at least a portion of said coating is scraped from said tab during assembly.

3. The structure of claim 2 wherein the tab is bent over upon the outer surface of said plate in final assembly.

4. The structure of claim 2 wherein the overall cross-sectional area of the tab converges from the base toward the free extremity thereof and the over-all cross-sectional area of said tab at its base is greater than the initial area of the slot in said plate whereby to enhance the scraping action.

5. The structure of claim 2 wherein a face of the tab adjacent its base is provided with a series of spaced apart projections which engage an edge of the slot to enhance the scraping action.

6. The structure of claim 2 wherein a face of the tab at at least its base portion is knurled to provide a series of sharp projections, the tab being of greater thickness over-all through said projections than the width of the slot whereby the projections engage the terminal plate at an edge of the slot and dig into said edge.

7. The structure of claim 2 wherein the plate is provided with a projection in said slot which frictionally engages the tab.

8. The structure of claim 2 wherein the plate is provided with cantilever springs extending into said slot from opposite sides thereof and deformed upwardly with the free ends thereof in pressure engagement with the tab.

JACK L. PETERSON.

REFERENCES CITED

The following references are of record in the file of this patent:

UNITED STATES PATENTS

| Number | Name | Date |
|---|---|---|
| 2,495,247 | Friedman | Jan. 24, 1950 |
| 2,519,053 | Reinhardt | Aug. 15, 1950 |

FOREIGN PATENTS

| Number | Country | Date |
|---|---|---|
| 109,774 | Switzerland | Apr. 16, 1925 |
| 368,157 | Great Britain | Mar. 3, 1932 |
| 511,952 | Germany | Feb. 1, 1930 |
| 958,606 | France | Mar. 14, 1950 |